(12) United States Patent
Boskovic et al.

(10) Patent No.: US 7,801,719 B2
(45) Date of Patent: Sep. 21, 2010

(54) PROCESSOR-BASED SYSTEM ANALYSIS AUTOMATION

(75) Inventors: Srdjan Boskovic, Walldorf (DE); Dirk A. Giebel, Walldorf (DE)

(73) Assignee: SAP AG, Walldorf (DE)

(*) Notice: Subject to any disclaimer, the term of this patent is extended or adjusted under 35 U.S.C. 154(b) by 943 days.

(21) Appl. No.: 11/644,487

(22) Filed: Dec. 21, 2006

(65) Prior Publication Data

US 2008/0155356 A1     Jun. 26, 2008

(51) Int. Cl.
*G06F 17/50* (2006.01)
(52) U.S. Cl. .......................... 703/19; 715/239
(58) Field of Classification Search .................. 703/19; 707/1
See application file for complete search history.

(56) References Cited

OTHER PUBLICATIONS

Microsoft .Net Framework, Troubleshooting Common Problems with the XmlSerializer, Christoph Schittko, May 2004 and.*
Microsoft .Net Framework, Exchanging XML with SQL Server 2000 and Reporting Services through the Web and Web Services, Venkat Prasad, Jan. 2005.*

* cited by examiner

*Primary Examiner*—Kamini S Shah
*Assistant Examiner*—Saif A Alhija
(74) *Attorney, Agent, or Firm*—Schwegman, Lundberg & Woessner, P.A.

(57) ABSTRACT

In an embodiment, data in a first processor-based system is captured and serialized into an XML format. The XML-formatted data is transmitted to a second processor-based system, it is deserialized into a non-XML format, and it is processed in the second processor-based system. The second processor-based system is substantially similar to the first processor-based system, and the processing of the deserialized data on the second processor-based system relates to a support of the first processor-based system.

19 Claims, 7 Drawing Sheets

PROCESSOR-BASED SYSTEM ANALYSIS AUTOMATION

TECHNICAL FIELD

Various examples relate to the field of processor-based system analysis, and in an example, but not by way of limitation, the automation of processor-based system analysis.

BACKGROUND

System analysis of computer and other processor-based systems is an involved and painstaking process. Such systems analyses may include system testing, unit and/or module testing, and performance analysis just to name a few.

Whatever the analysis, test data is normally required for that analysis. The creation and maintenance of such test data and the expected output generated by that test data is not a trivial task. This is particularly true when a system comprises a multitude of modules or units, and each module requires a different format for its input data and produces its output data in a different format. This is further complicated when one is dealing with multiple systems, such as a production or customer system and a test or reference system. Such test data is normally painstakingly manually prepared, and as such, is susceptible to errors. The art is therefore in need of an alternative method of analyzing and/or testing processor-based systems.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

The creation and maintenance of test data for processor-based systems is one of the more neglected, difficult, and painful aspects of system design, creation, and maintenance. This is particularly the case for systems that are updated and enhanced after the initial creation and implementation of the system. Therefore, one or more embodiments of the present disclosure seek to automate the creation and maintenance of test data for system tests, unit tests, and/or other tests of a processor-based system. Several embodiments automate this process by capturing data from a production system. In a particular embodiment, data that caused an error in the production system is captured so that that data can be used in testing the software fixes that are implemented to address the production error. Moreover, when an error occurs in the production system, the error can be localized in the production system and classified as a known error or unknown/new error.

Figure 1:
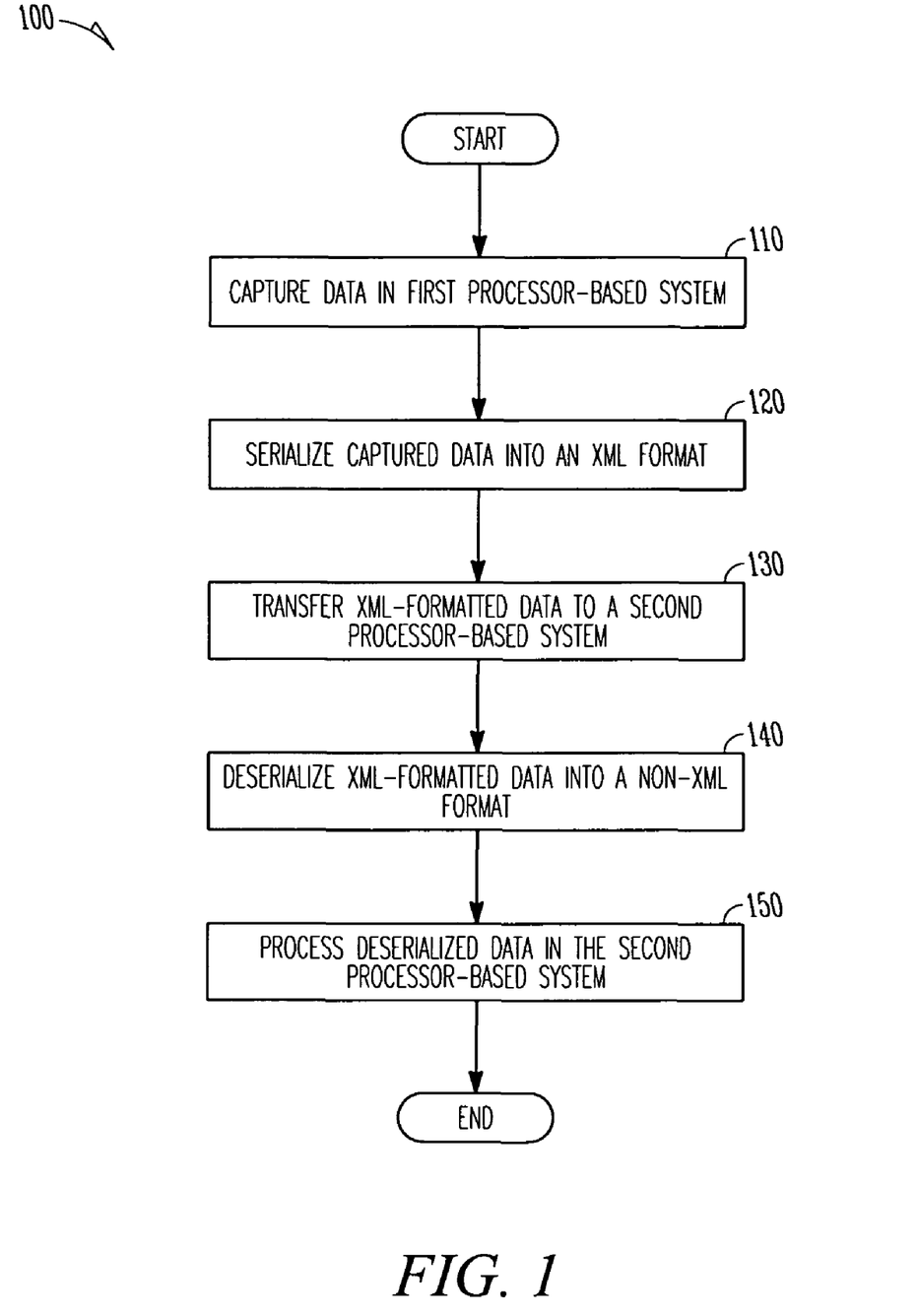
FIG. 1 illustrates an example embodiment of a process to automatically analyze a processor-based system.
Figure 1A:
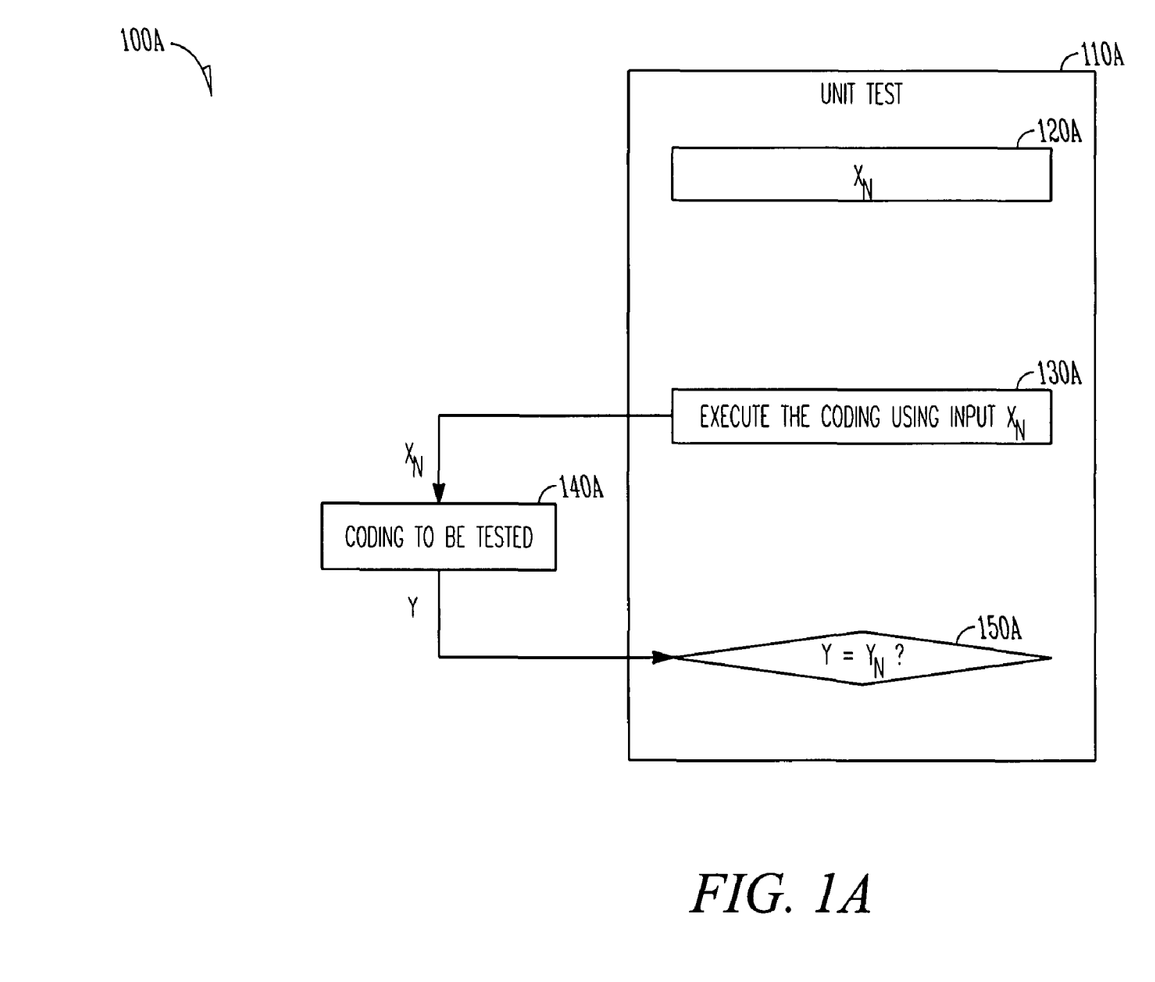
FIG. 1A illustrates a block diagram of the example embodiment of FIG. 1.

FIG. 1 illustrates a flowchart of an example process 100 to automate system analysis of a processor-based system. Such an analysis can include unit testing, system testing, system diagnostics, etc. An example of a unit test 100A is illustrated in FIG. 1A. In FIG. 1A, a unit test module 110A includes input test data $X_n$ (120A). The code for the module under test is executed at 130A, and the coding being tested at 140A receives as input the input test data $X_n$ and produces an output Y. At 150A, the output Y generated by the unit test is compared to an expected output $Y_n$ at 150A.

Referring back to FIG. 1, at 110, data from a first processor-based system is captured. This data can include input data and/or output data, and the data may be stored in a file, database, or other memory. At 120, the captured data is serialized into an XML format. As noted above, the serialization of this data is particularly useful when there are several different data formats in the first processor-based system. At 130, the XML-formatted data is transmitted to a second processor-based system. At 140, in the second processor-based system, the XML-formatted data is deserialized into a non-XML format. As an example, the data could have been in binary form in the first processor-based system, and in the second processor-based system, the data is converted back into its binary format. At 150, the deserialized data is processed in the second processor-based system. In an embodiment, the second processor-based system is substantially similar to the first processor-based system. In another embodiment, the processing of the deserialized data on the second processor-based system relates to a support of the first processor-based system. In yet another embodiment, the first processor-based system and the second processor-based system are the same system. In such a case, the data that is captured is processed on the same system, but perhaps at a later time.

Figure 2:
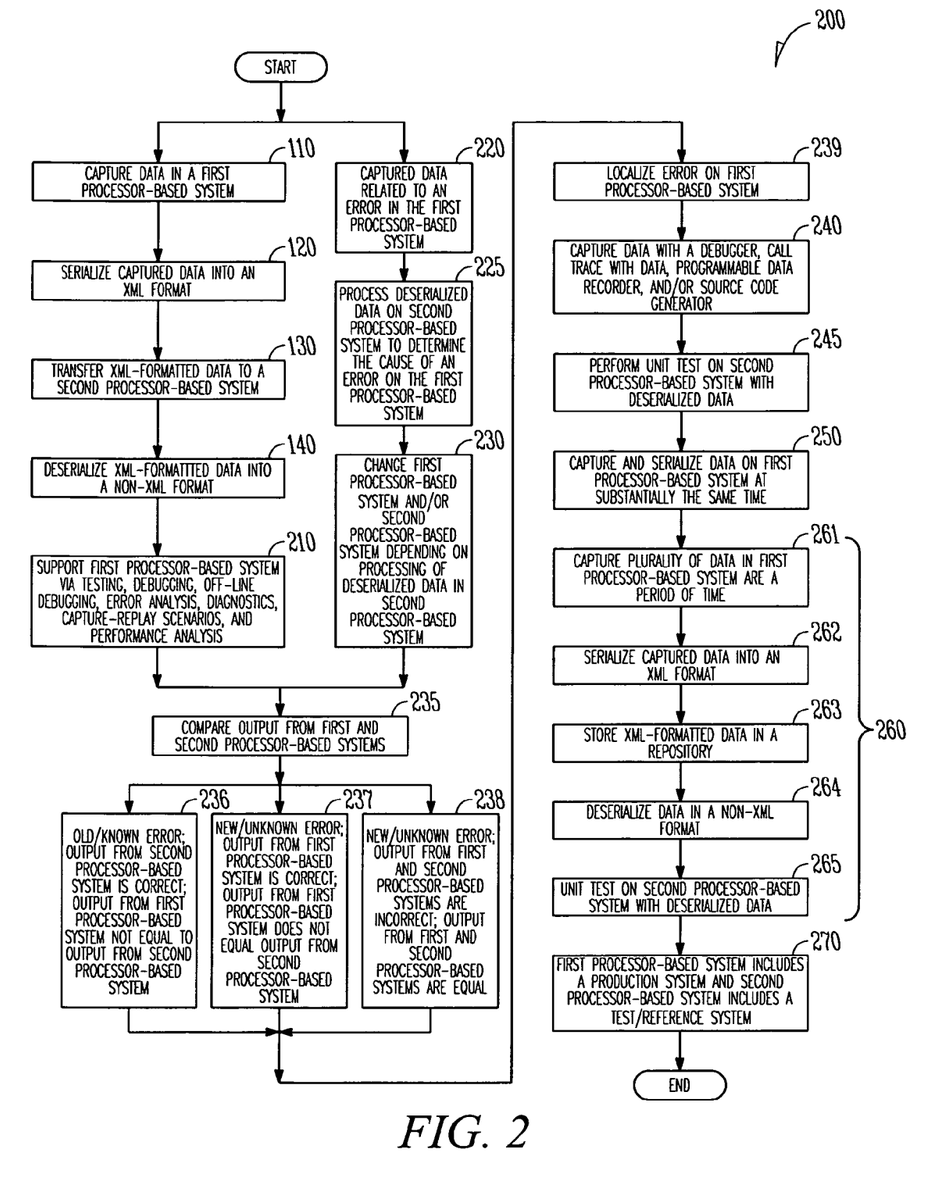
FIG. 2 illustrates another example embodiment of a process to automatically analyze a processor-based system.

FIG. 2 illustrates a flowchart of another example process 200 to automate system analysis of a processor-based system. Like the process 100, the process 200 can relate to unit testing, system testing, system diagnostics, etc. As can be seen from FIG. 2, the process 200 includes the steps 110, 120, 130, 140, and 150 of process 100. The process 200 includes additional steps. At 210, the support of the first processor-based system provided by the processing of the deserialized data relates to one or more of testing, debugging, off-line debugging, error analysis, diagnostics, capture replay scenarios, and performance analysis. The testing can include unit testing, system testing, sub-system testing, etc. The deserialized data can also be used for debugging. The debugging can include the use of an online debugger. In another embodiment, the second processor-based system can be executed with the data captured in the first processor-based system, and the output written to a file in an XML format. This output can then easily be compared either visually or with the use of XML analysis tools that are well known in the art. Capture-replay scenarios relate to the capture of the data in the first processor-based system, and the execution (or replay) of that data in the second processor-based system. The replay of the data can be done over and over again, and with each replay different aspects of the system can be changed and the effect of that change on the system can be analyzed.

As disclosed above, the deserialized data can be used for off-line debugging. In traditional, on-line debugging, the debugee steps through the program execution and investigates the program flow and data. It is done manually and on-line, with temporary breaks of the program execution. By comparison, off-line debugging may be defined as a methodology of extraction of information on program flow and/or processed data from a running system, with or without the interrupting the program execution, and later analysis of captured information, by human or machine. Information can be extracted using one or more of a call trace, a call-trace with data, a programmable data recorder or even a classical debugger with XML exports. Such information can be captured as one or more XML documents and investigated later, off-line, by a human or a machine.

At 220, the data that is captured in the first processor-based system is related to an error in the first processor-based system. That is, the input that caused the error is captured in the first processor-based system (this could be data that was input into the system from outside of the system, or data that was generated within the system and then input into a module in the system), serialized into an XML format, transmitted to the second processor-based system, deserialized, and used in debugging, testing, and other analysis to try to determine the cause of the error. Specifically, at 225, the deserialized data is processed on the second processor-based system to determine the cause of the error on the first processor-based system, and at 230, the first processor-based system and/or the second processor-based system are altered as a function of the processing of the deserialized data on the second processor-based system. As noted above, this step does away with the painstaking process of creating test data for debugging and error analysis. Rather, the exact data that caused the error, which can be in one or more of a multitude of different formats, is converted to XML, transferred to the second processor-based system, deserialized, and used in the testing and debugging on the second processor-based system.

At 235, an output of the first processor-based system is compared with an output of the second processor-based system. There are at least three scenarios that can result from this comparison. At 236, the output of the first processor-based system can be classified as an old error when the output of the second processor-base system is correct, and the output of the first processor-based system does not equal the output of the second processor-based system. At 237, the output of the first processor-based system can be classified as a new error when the output of the first processor-based system is correct, and the output of the first processor-based system does not equal the output of the second processor-based system. At 238, the output of the first processor-based system can be classified as a new error when the output of the first processor-based system is incorrect and the output of the second processor-based system is incorrect, and the output of the first processor-based system equals the output of the second processor-based system. The output of steps 235, 236, 237, and 238 may be an output from the system, or an output from a module within the system.

At 239, based on the analysis in steps 235, 236, 237, and 238, a particular unit, module, object, or service provider on the first processor-based system in which the error occurred is localized. This localizing can be performed by a comparison of an output of the first processor-based system to an output of the second processor-based system on a modular or unit level, and/or a comparison of a trace of data and program flow on the first processor-based system with a trace of data and program flow on the second processor-based system.

At 240, the capturing of data in the first processor-based system includes the use of a debugger, a call trace with data, a programmable data recorder, and/or a source code generator. With a debugger, data can be captured from the debugger environment, serialized, transmitted, and deserialized. The call trace with data functionality generates XML content with information on the program flow and/or data associated with the program, wherein non-XML data are serialized into XML. It is this data that can be captured, serialized, transmitted, and deserialized. Similarly, a programmable data recorder can include code within a module that extracts data associated with the execution of the module. Once again, this data can be serialized, transmitted, and deserialized.

Figure 3:
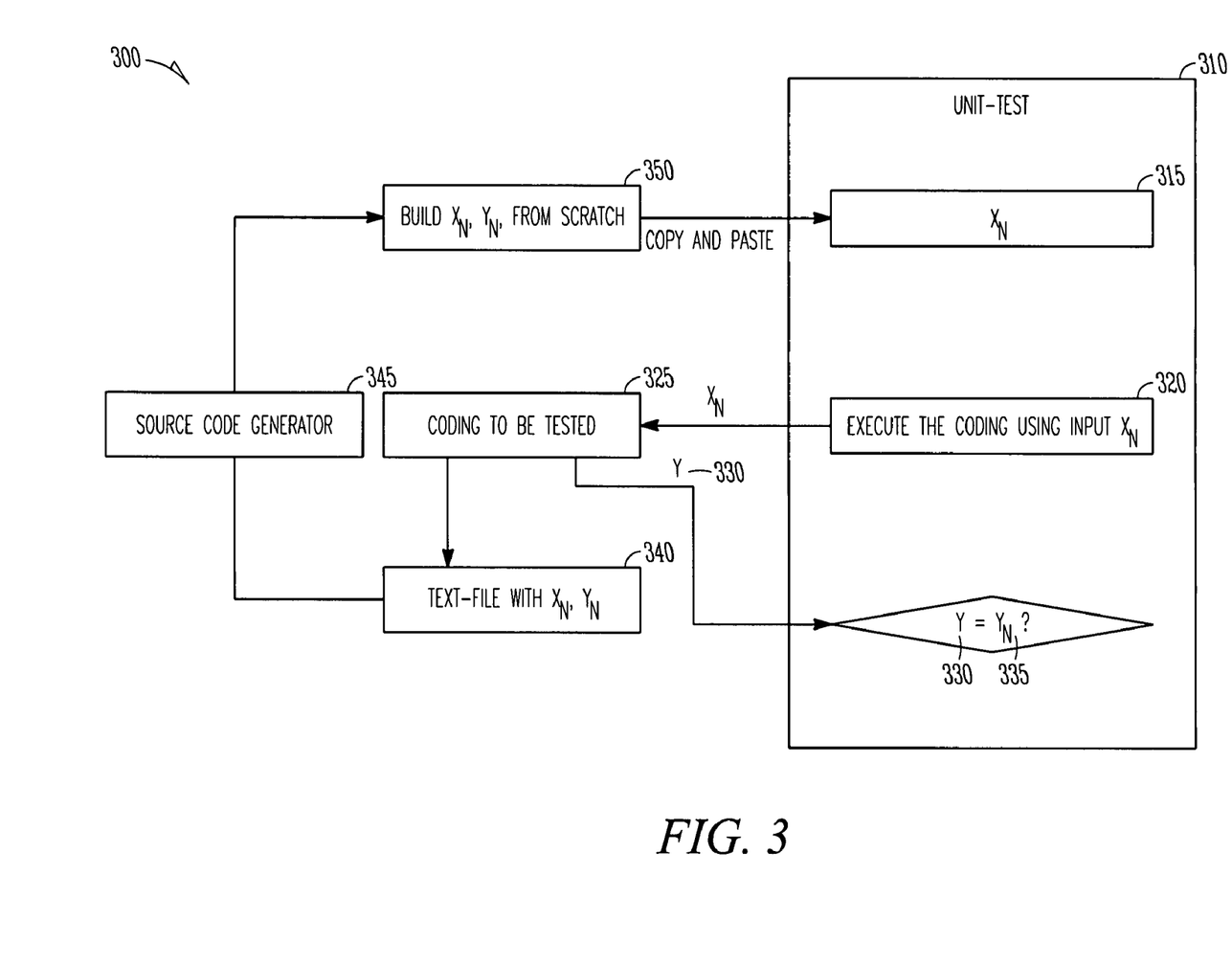
FIG. 3 illustrates a block diagram of an example embodiment of a process to automatically analyze a processor-based system in connection with a source code generator.

FIG. 3 illustrates a system 300 that uses of a source code generator. In contrast to the data capture functionalities of a debugger, a call trace with data, and a programmable data recorder, a source code generator generates source code that resembles the data associated with the execution of the program. This source code can then be moved from the first processor-based system to the second processor base system where it can be inserted into a module and tested. In FIG. 3, a unit test module 310 includes a set of test input data $X_n$ (315). At 320, the coding involved in the unit test 310 is executed using the input $X_n$. The coding is tested at 325, and an output Y (330) is generated. At this point, the output Y can be compared to an expected output $Y_n$ (335) to determine if the module under test generated the expected results. Alternatively, the test input data $X_n$ and the expected output data $Y_n$ can be used at 340 as input to a source code generator 345 which then generates source code at 350 for the input data $X_n$ and the expected output data $Y_n$. This source code can them be compiled or otherwise incorporated into the module under test in the unit test 310.

Referring back to FIG. 2, at 245, the deserialized data is processed on the second processor-based system in connection with a unit test of one or more modules on the second processor-based system. At 250, the capturing of the data in the first processor-based system and the serializing of the captured data into an XML format are done substantially simultaneously.

At 260, data is captured and then stored for future diagnostics and testing. As previously noted, this capture and storage removes the painstaking and error prone step of manually creating and maintaining data for system/unit diagnosis and testing. (Such data is referred to as a golden file by some of skill in the art as it is very valuable because of all the work it took to create the file). Specifically, at 261, a plurality of data is captured in the first processor-based system over a period of time. In a particular embodiment, this captured data is data that have caused errors in the first processor-based system. At 262, the data is serialized into an XML format, and at 263, the plurality of data in the XML format is stored in a data repository. At 264, the data is deserialized into a non-XML format, and at 265, the deserialized data are used in unit or other tests on the second processor-based system.

At 270, the first processor-based system includes a production system and the second processor-based system includes a test or reference system.

Figure 4:
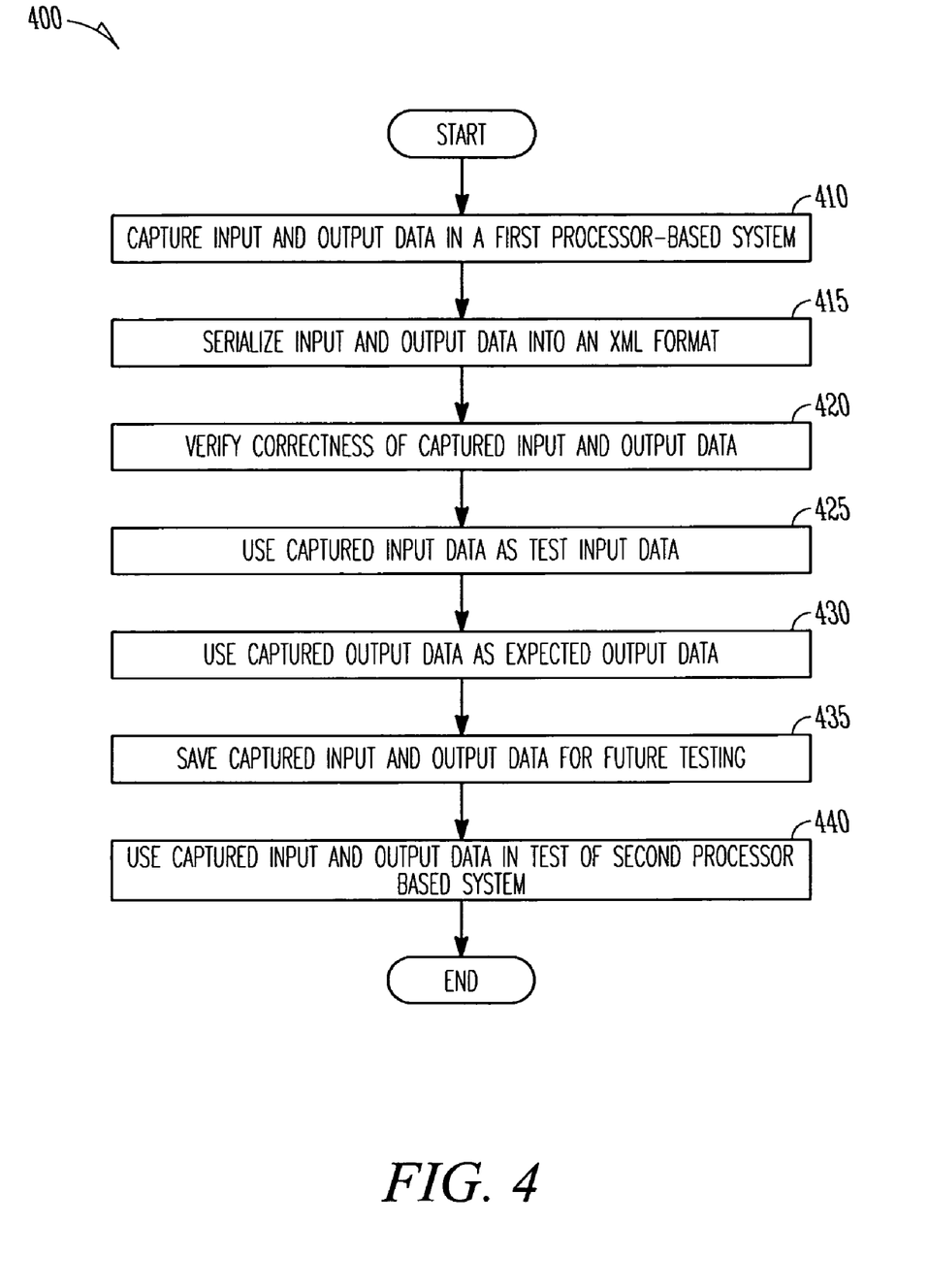
FIG. 4 illustrates another example embodiment of a process to automatically analyze a processor-based system.

FIG. 4 illustrates a flowchart of another example process 400 to automate system analysis of a processor-based system. Like the processes 100 and 200, the process 400 can relate to unit testing, system testing, system diagnostics, etc. At 410, input data and output data are captured in a first processor-based system. As previously noted, the data can be captured in several ways such as with a debugger, a call trace with data functionality, and a programmable data recorder. At 415, the input data and output data are serialized into an XML format. At 420, the correctness of the captured input data and the captured output data is verified. For example, verification of the output data can be accomplished by comparing the output data to a file that contains known expected output for the system or module. At 425, the captured input data is used as test input data in testing the first processor-based system, and at 430, the captured output data is used as expected output data in testing the first processor-based system. At 435, the captured input data and the captured output data are saved for additional testing of the first processor-based system. At 440, the captured input data and/or the captured output data are used in a test of a second processor-based system. In an embodiment, the second processor-based system is substantially similar to the first processor-based system. In a particular embodiment, the second processor-based system is a test or reference system in relation to the first processor-based system.

Figure 5:
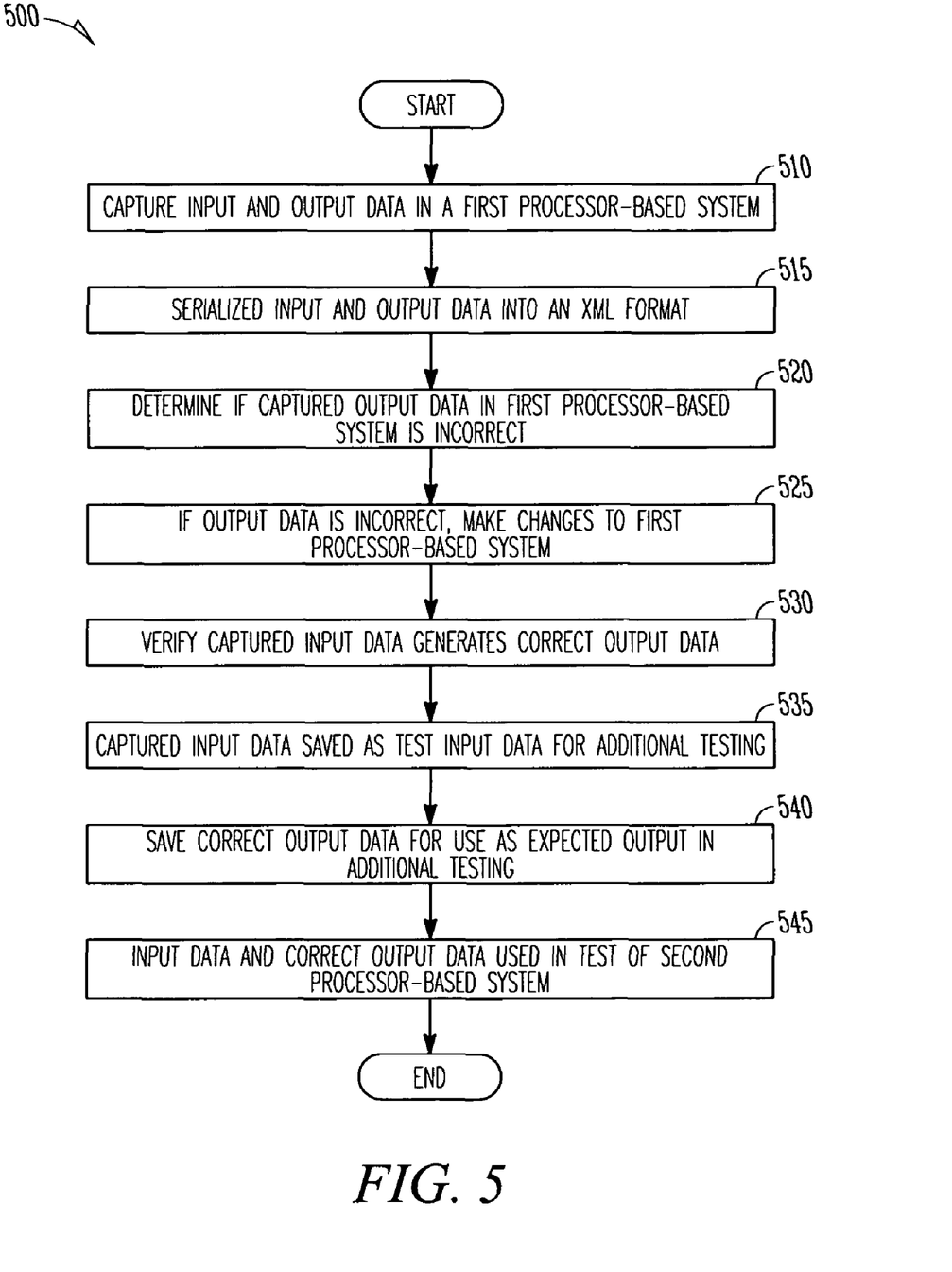
FIG. 5 illustrates another example embodiment of a process to automatically analyze a processor-based system.

FIG. 5 illustrates a flowchart of another example process 500 to automate system analysis of a processor-based system. Like the processes 100, 200, and 400, the process 500 can relate to unit testing, system testing, system diagnostics, etc. At 510, input data and output data are captured in a first processor-based system. At 515, the input data and output data are serialized into an XML format. At 520, it is determined if the captured output data in the first processor-based system is incorrect. If it is, at 525, changes are made to the first processor-based system. At 530, the captured input data is used again to verify that the first processor-based system this time generates correct output data. At 535, the captured input data are saved for use as test input data in additional testing of the first processor-based system, and at 540, the correct output data generated after the changes to the first processor-based system are saved for use as expected output in additional testing of the first processor-based system.

At 545, the input data and/or the correct output data are used in a test of a second processor-based system. In a particular embodiment, the second processor-based system is substantially similar to the first processor-based system. For example, the second processor-based system can be a test or reference system of the first processor-based system.

Figure 6:
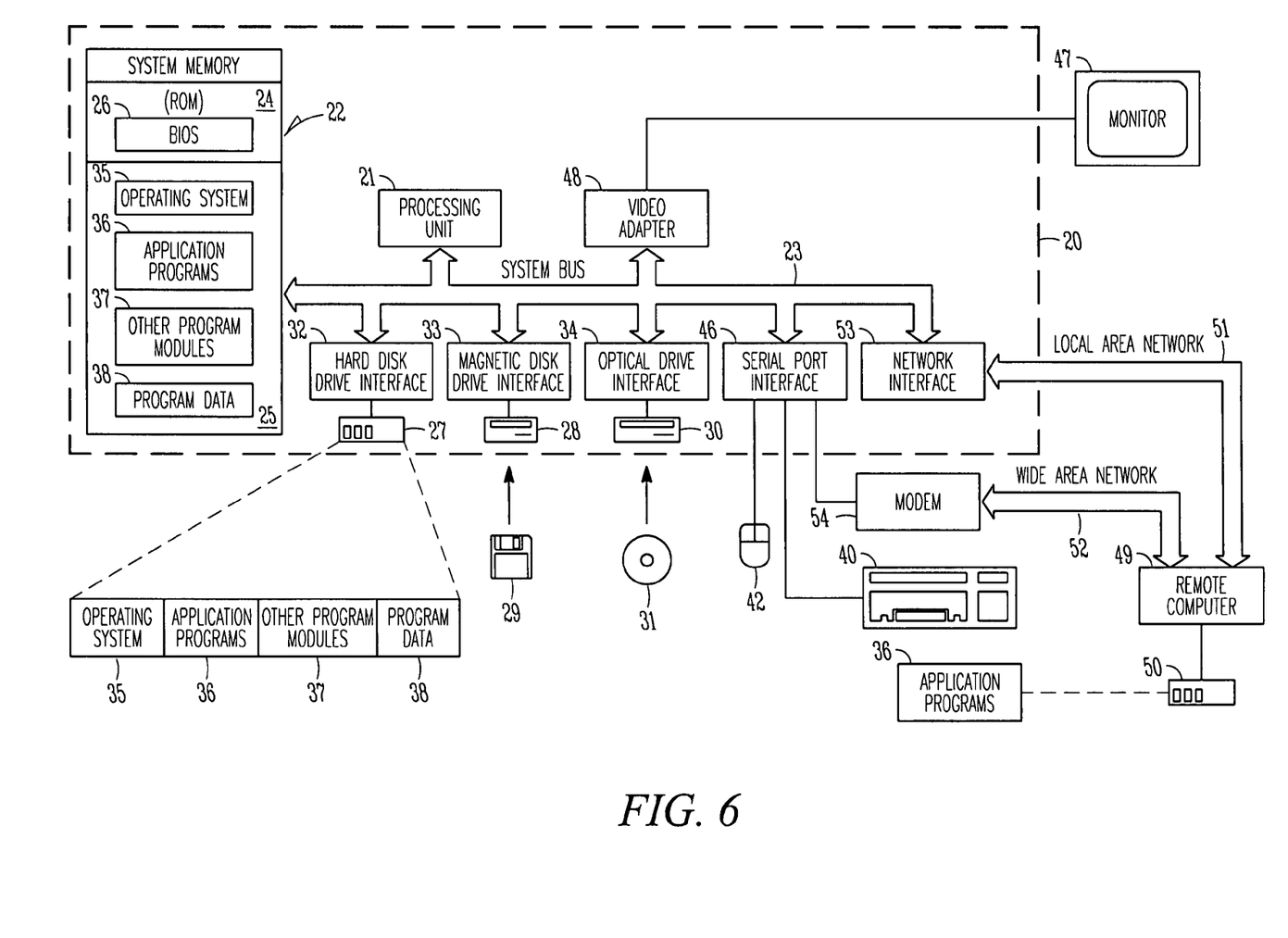
FIG. 6 illustrates an example embodiment of a processor-based system upon which and/or in connection with which one or more examples of the present disclosure may operate.

FIG. 6 is an overview diagram of a hardware and operating environment in conjunction with which embodiments of the disclosure may be practiced. The description of FIG. 6 is intended to provide a brief, general description of suitable computer hardware and a suitable computing environment in conjunction with which the disclosure may be implemented. In some embodiments, the examples of the disclosure are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the examples of the disclosure may be practiced with other computer system configurations, including hand-held devices, multiprocessor systems, microprocessor-based or programmable consumer electronics, network PCS, minicomputers, mainframe computers, and the like. The examples of the disclosure may also be practiced in distributed computer environments where tasks are performed by I/O remote processing devices that are linked through a communications network. In a distributed computing environment, program modules may be located in both local and remote memory storage devices.

In the embodiment shown in FIG. 6, a hardware and operating environment is provided that is applicable to any of the servers and/or remote clients shown in the other Figures.

As shown in FIG. 6, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the examples in the disclosure are not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 5 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

In the foregoing detailed description, various features are grouped together in one or more examples or examples for the purpose of streamlining the disclosure. This method of disclosure is not to be interpreted as reflecting an intention that the claimed examples of the invention require more features than are expressly recited in each claim. Rather, as the following claims reflect, inventive subject matter lies in less than all features of a single disclosed example. Thus the following claims are hereby incorporated into the detailed description of examples of the invention, with each claim standing on its own as a separate example. It is understood that the above description is intended to be illustrative, and not restrictive. It is intended to cover all alternatives, modifications and equivalents as may be included within the scope of the invention as defined in the appended claims. Many other examples will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method comprising:
capturing data in a first processor-based system;
serializing the captured data into an XML format;
transmitting the XML-formatted data to a second processor-based system;
deserializing the XML-formatted data into a non-XML format;
processing the deserialized data in the second processor-based system;
comparing an output of the first processor-based system with an output of the second processor-based system;
classifying the output of the first processor-based system as an old error when the output of the second processor-base system is correct, and the output of the first processor-based system does not equal the output of the second processor-based system;
classifying the output of the first processor-based system as a new error when the output of the first processor-based system is correct, and the output of the first processor-based system does not equal the output of the second processor-based system; and
classifying the output of the first processor-based system as a new error when the output of the first processor-based system is incorrect and the output of the second processor-based system is incorrect, and the output of the first processor-based system equals the output of the second processor-based system;
wherein the second processor-based system is substantially similar to the first processor-based system; and
wherein the processing of the deserialized data on the second processor-based system relates to a support of the first processor-based system.

2. The method of claim 1, wherein the support of the first processor-based system relates to one or more of testing, debugging, off-line debugging, error analysis, diagnostics, capture-replay scenario, and performance analysis.

3. The method of claim 1, wherein the capturing data in the first processor-based system is related to an error in the first processor-based system.

4. The method of claim 3, further comprising:
processing the deserialized data on the second processor-based system to determine the cause of the error on the first processor-based system; and
altering one or more of the first processor-based system and the second processor-based system as a function of the processing of the deserialized data on the second processor-based system.

5. The method of claim 1, wherein the capturing data in the first processor-based system includes the use of one or more of a debugger, a call trace with data, a programmable data recorder, and a source code generator.

6. The method of claim 1, further comprising processing the deserialized data on the second processor-based system in connection with a unit test of one or more modules on the second processor-based system.

7. The method of claim 1, wherein the capturing data in the first processor-based system and serializing the captured data into an XML format are done substantially simultaneously.

8. The method of claim 1, further comprising localizing a particular unit, module, object, or service provider on the first processor-based system in which the error occurred; wherein the localizing is performed by one or more of a comparison of an output of the first processor-based system to an output of the second processor-based system on a modular or unit level, or a comparison of a trace of data and program flow on the first processor-based system with a trace of data and program flow on the second processor-based system.

9. The method of claim 1, further comprising:
capturing a plurality of data in the first processor-based system over a period of time that have caused errors in the first processor-based system;
serializing the data into an XML format;
storing the plurality of data in the XML format in a data repository;
deserializing the data into an XML format; and
using the deserialized data in unit tests on the second processor-based system.

10. The method of claim 1, wherein the first processor-based system comprises a production system and the second processor-based system comprises a test or reference system.

11. A method comprising:
capturing input data and output data in a first processor-based system;
serializing the input data and output data into an XML format;
verifying the correctness of the captured input data and the captured output data;
using the captured input data as test input data in testing the first processor-based system;
using the captured output data as expected output data in testing the first processor-based system;
saving the captured input data and the captured output data for additional testing of the first processor-based system;
comparing an output of the first processor-based system with an output of a second processor-based system;
classifying the output of the first processor-based system as an old error when the output of the second processor-base system is correct, and the output of the first processor-based system does not equal the output of the second processor-based system;
classifying the output of the first processor-based system as a new error when the output of the first processor-based system is correct, and the output of the first processor-based system does not equal the output of the second processor-based system; and
classifying the output of the first processor-based system as a new error when the output of the first processor-based system is incorrect and the output of the second processor-based system is incorrect, and the output of the first processor-based system equals the output of the second processor-based system.

12. The method of claim 11, wherein one or more of the captured input data and the captured output data are used in a test of the second processor-based system.

13. The method of claim 11, wherein the second processor-based system is substantially similar to the first processor-based system.

14. A method comprising:
capturing input data and output data in a first processor-based system;
serializing the input data and output data into an XML format;
determining that the captured output data in the first processor-based system is incorrect;
making changes to the first processor-based system;
using the captured input data to verify that the first processor-based system generates correct output data;
saving the captured input data for use as test input data in additional testing of the first processor-based system;
saving the correct output data generated after the changes to the first processor-based system for use as expected output in additional testing of the first processor-based system;
comparing an output of the first processor-based system with an output of a second processor-based system;
classifying the output of the first processor-based system as an old error when the output of the second processor-base system is correct, and the output of the first processor-based system does not equal the output of the second processor-based system;
classifying the output of the first processor-based system as a new error when the output of the first processor-based system is correct, and the output of the first processor-based system does not equal the output of the second processor-based system; and
classifying the output of the first processor-based system as a new error when the output of the first processor-based system is incorrect and the output of the second processor-based system is incorrect, and the output of the first processor-based system equals the output of the second processor-based system.

15. The method of claim 14, wherein one or more of the input data and the correct output data are used in a test of the second processor-based system.

16. The method of claim 14, wherein the second processor-based system is substantially similar to the first processor-based system.

17. A non-transitory machine readable medium comprising instructions for executing a process comprising: capturing data in a first processor-based system; serializing the captured data into an XML format; transmitting the XML-formatted data to a second processor-based system; deserializing the XML-formatted data into a non-XML format; and processing the deserialized data in the second processor-based system; comparing an output of the first processor-based system with an output of the second processor-based system; the output of the first processor-based system as an old error when the output of the second processor-base system is correct, and the output of the first processor-based system does not equal the output of the second processor-based system, classifying the output of the first processor-based system as a new error when the output of the first processor-based system is correct, and the output of the first processor-based system does not equal the output of the second processor-based system, and classifying the output of the first processor-based system as a new error when the output of the first processor-based system is incorrect and the output of the second processor-based system is incorrect, and the output of the first processor-based system equals the output of the second processor-based system, wherein the second processor-based system is substantially similar to the first processor-based system; and wherein the processing of the deserialized data on the second processor-based system relates to a support of the first processor-based system.

18. The non-transitory machine readable medium of claim 17, wherein the machine readable medium comprises one or more of a debugger, a call trace with data, a programmable data recorder, and a source code generator.

19. The non-transitory machine readable medium of claim 17, further comprising instructions for: capturing a plurality of data in the first processor-based system over a period of time that have caused errors in the first processor-based system; serializing the data into an XML format; storing the plurality of data in the XML format in a data repository; deserializing the data into an XML format; and using the deserialized data in unit tests on the second processor-based system.

* * * * *